United States Patent
Eger et al.

(10) Patent No.: US 12,155,290 B2
(45) Date of Patent: Nov. 26, 2024

(54) ELECTRONICALLY COMMUTATED ROTATING ELECTRICAL MACHINE WITH A GAP IN A HOUSING FOR COOLING AIR FLOW

(71) Applicant: Weg Equipamentos Elétricos S.A., Jaraguá do Sul (BR)

(72) Inventors: Roger Schipmann Eger, Jaraguá do Sul (BR); Ramon Gomes Da Silva, Jaraguá do Sul (BR); Rubens Fernando Missio, Jaraguá do Sul (BR)

(73) Assignee: Weg Equipamentos Elétricos S.A., Jaraguá do Sul (BR)

( * ) Notice: Subject to any disclaimer, the term of this patent is extended or adjusted under 35 U.S.C. 154(b) by 424 days.

(21) Appl. No.: 17/116,550

(22) Filed: Dec. 9, 2020

(65) Prior Publication Data

US 2021/0175773 A1    Jun. 10, 2021

Related U.S. Application Data

(60) Provisional application No. 62/945,766, filed on Dec. 9, 2019.

(51) Int. Cl.
*H02K 5/20* (2006.01)
*H02K 5/18* (2006.01)

(52) U.S. Cl.
CPC ............... *H02K 5/207* (2021.01); *H02K 5/18* (2013.01)

(58) Field of Classification Search
CPC ........... H02K 5/207; H02K 5/18; H02K 9/02; H02K 9/04; H02K 9/22; H02K 9/227
See application file for complete search history.

(56) References Cited

U.S. PATENT DOCUMENTS

| | | | | |
|---|---|---|---|---|
| 4,009,405 A | * | 2/1977 | Gleichman | H02K 9/06 310/58 |
| 6,700,237 B1 | * | 3/2004 | Yang | H02K 9/26 165/47 |
| 2014/0265664 A1 | * | 9/2014 | Camilleri | H02K 15/14 310/59 |
| 2016/0079824 A1 | * | 3/2016 | McKinzie | H02K 5/207 310/58 |
| 2016/0201690 A1 | * | 7/2016 | Chou | H02K 5/207 417/366 |
| 2018/0076693 A1 | * | 3/2018 | Maschke | H02K 11/33 |

* cited by examiner

*Primary Examiner* — Tulsidas C Patel
*Assistant Examiner* — Robert E Mates
(74) *Attorney, Agent, or Firm* — Aaron Schulman, Esq.; Stites & Harbison, PLLC

(57) ABSTRACT

An electronically commutated rotating electric machine comprising a first housing part, housing the active core of the machine and a second housing part that houses the control drive, wherein the first and second housing parts are configured such that, after being connected to one another, a gap is formed between them; the parts having deflecting portions that are configured to direct an air flow into the gap.

3 Claims, 4 Drawing Sheets

ELECTRONICALLY COMMUTATED ROTATING ELECTRICAL MACHINE WITH A GAP IN A HOUSING FOR COOLING AIR FLOW

CROSS-REFERENCE TO RELATED APPLICATIONS

This application claims the benefit of U.S. Provisional Application Ser. No. 62/945,766, filed Dec. 9, 2019, said application herein incorporated by reference in its entirety.

FIELD OF THE INVENTION

The present invention relates to an electronically commutated rotating electric machine, and more specifically, to a heat dissipating solution for an electronically commutated rotating electric machine.

BACKGROUND OF THE INVENTION

Electronically commutated rotating electric machines, such as electronically commutated motors (EC motors), are machines that use an electronic control drive for varying machine speed.

EC motors comprise a housing with a first housing part for housing the motor components and a second housing part for housing the drive.

One of the challenges associated with electronically commutated rotating electric machines is related to the temperature reached by the machines. In fact, both engine components and electronic control components generate heat during operation, so it is necessary to develop some type of ventilation solution to cool components and prevent malfunctions and malfunctions.

One of the well-known solutions for cooling ECM machines is to provide air inlet and outlet openings in the housing to allow air to circulate and cool the components by heat exchange.

Another known solution is described in document US10291102B2, which describes a motor including a housing, a front cover and a fan, in which the front cover is formed with air inlet holes and with air guiding fins.

Another solution is described in document EP3043450, which discloses a motor with a substantially cylindrical housing and a cooling fan. The motor also includes a sleeve fitted around the housing and formed integrally with a plurality of wind capture projections to receive the air flow induced by the cooling fan.

Document EP2973957 shows yet another ventilation solution, in which the electrical machine includes a housing with at least one air inlet, one air outlet and an air passage that extends between at least one air inlet and the air outlet. The electric machine also includes a first heat sink positioned at least partially within the air passage and a second heat sink positioned at least partially within the air passage downstream of the first heat sink. A flow of cooling air through the at least one air inlet flows through the air passage to cool the first heat sink and the second heat sink before the cooling air flow is exhausted by the air outlet.

WO2004023628, in turn, describes an electric motor cooling solution, in which the motor comprises a first housing having a first wall defining a first interior space and at least one opening arranged on a surface of the first housing; a second compartment having a second wall defining a second interior space and at least one opening arranged on a surface of the second compartment.

Even though different cooling solutions have been developed, the need for electronically commutated rotating electric machine with a thermal dissipation solution that operates efficiently with air flows in both axial directions, and which is easy to assemble and small in size, remains in the state of the art.

SUMMARY OF THE INVENTION

It is an object of the present invention to provide an electronically commutated rotating electric machine with an improved thermal dissipation solution.

It is another object of the present invention to provide an electronically commutated rotating electric machine with a heat dissipating solution that operates with both axial (bidirectional) air flows.

It is yet another object of the present invention to provide an electronically commutated rotating electric machine that is easy to assemble and maintain.

It is a further object of the present invention to provide an electronically commutated rotating electric machine having small dimensions.

BRIEF DESCRIPTION OF THE INVENTION

The present invention contemplates an electronically commutated rotating electric machine comprising a first housing part housing the active machine core and a second housing part housing the control drive in accordance with the present invention, wherein:
  the first and second housing parts are configured such that, after being fixed to one another, a gap is formed between them;
  the first housing part comprises a rear plate with at least one deflecting portion;
  the second housing part comprises a front plate comprising at least one deflecting portion;
  The gap is formed between the rear plate and the front plate, so that the deflecting portions are configured to direct air flow into the gap.

In one embodiment of the invention, the deflecting portions are configured in a concave shape. However, the deflecting portions may have any other shapes that allow the air flow to be directed into the gap.

The first and second housing parts may be dimensioned such that:
  a portion of the rear plate surface directly receives an air flow flowing from a rear part of the machine; and a portion of the front plate surface directly receives an air flow flowing from a front of the machine.

In one embodiment of the invention, the deflecting portion of the rear plate is formed at the perimeter of said surface portion of the rear plate; and the deflecting portion of the front plate is provided at the perimeter of said surface portion of the front plate.

In this sense, an air flow can flow from the front of the machine to the rear, and this flow hits the deflecting portion of the rear part and is directed to the gap formed between the plates. In the deflecting portion of the front plate, a low pressure zone is formed due to the air flow, which helps in exhausting the heated air between the plates.

Similarly, an air flow can flow from the rear of the machine to the front, and this flow strikes the deflecting portion of the front and is directed to the gap formed between the plates. In the deflecting portion of the rear plate, a low pressure zone is formed due to the air flow, which helps to exhaust the heated air between the plates.

In addition, the front plate may have a plurality of heat exchange projections.

DETAILED DESCRIPTION OF THE INVENTION

Figure 1:
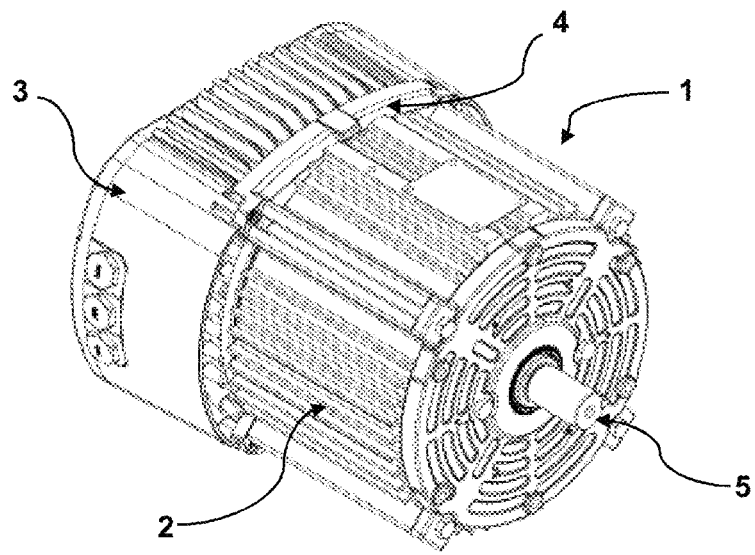
FIG. 1 is a perspective view of the electronically commuted rotating electric machine according to one embodiment of the present invention.
Figure 2:
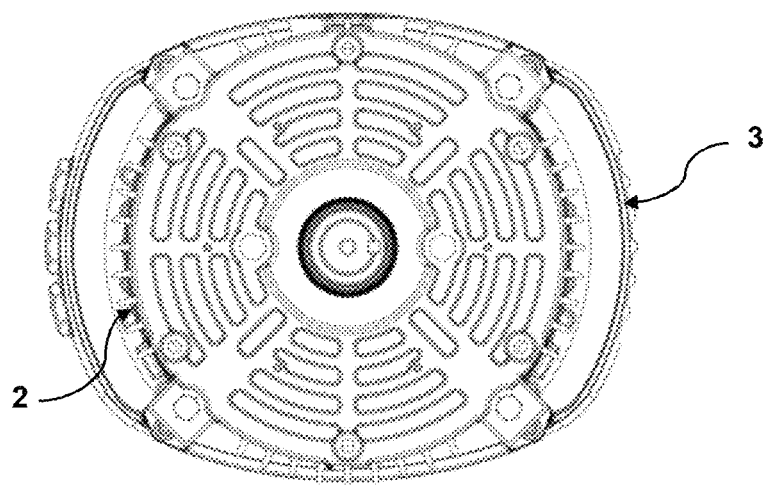
FIG. 2 is a front view of the electronically commuted rotating electric machine according to one embodiment of the present invention.
Figure 3:
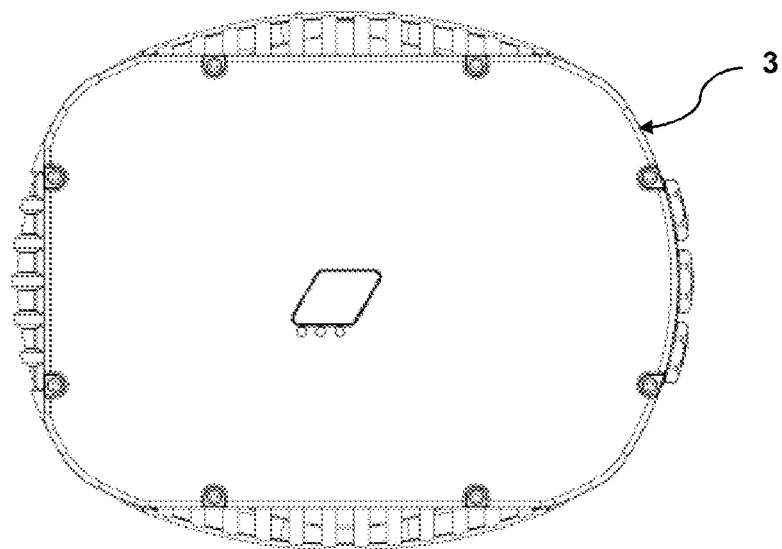
FIG. 3 is a rear view of the electronically commuted rotating electric machine according to one embodiment of the present invention.

FIGS. 1 to 7 show an embodiment of the electronically commuted rotating electric machine according to the present invention.

Although the figures illustrate an electronically commuted electric motor, it should be understood that the present invention could be applied to any electronically commuted rotating electric machine or any rotating electric machine with incorporated electronics.

As can be seen from the figures, the electronically commuted electric machine 1 comprises a first motor housing part 2 and a second control drive housing part 3. Motor housing 2 and control drive 3 parts are configured so that, after being connected to each other to form motor housing 1, a gap is formed between them.

The electronically commuted electric machine 1 of the present invention is designed for thermal dissipation to operate with air flow in both axial directions (bidirectional). That is, to allow thermal dissipation to occur with both an air flow flowing from the front of the motor housing part 2 and an air flow flowing from the rear of the control drive housing part 3.

To this end, the first and second housing parts 2 and 3 are dimensioned such that a part of the air flow that reaches the machine 1 in one of the axial directions is necessarily directed into the gap formed between the housing parts 1 and 2.

Figure 4:
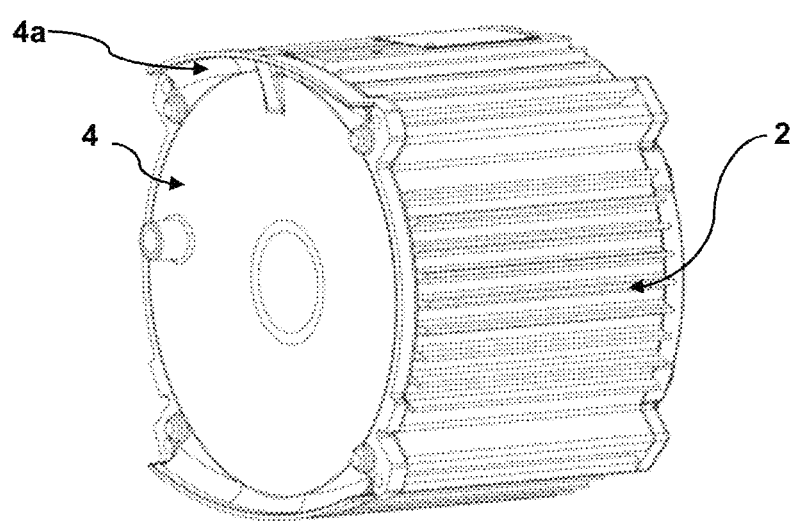
FIG. 4 is a perspective view of the motor part of the electronically commuted rotating electric machine in accordance with one embodiment of the present invention.

In the embodiment shown in the figures, the motor housing part 2 comprises a body with fins with a front housing part, which may for example be a front cover with a housing end with a shaft through hole 5, and a rear plate 4, which preferably has a concave shape and at least one deflecting portion 4a (see FIG. 4). It should be noted that, in other embodiments of the invention, the rear plate 4 could have another shape, for example, a flat or finned shape.

Control drive housing portion 3 comprises a housing body enclosed by a cove or rear housing portion and a front plate 6 comprising at least one deflecting portion 6a.

The deflecting portions 4a and 6a are configured to direct an air flow that reaches them into the gap, and are designed in a concave shape or any other shapes that allow the direction of the air flow into the gap. Thus, an air flow flowing from the front of the machine reaches the front plate 6 and has a portion directed towards the gap (see arrow S in FIG. 7 for the flow flowing from the front part).

In this sense, the deflecting portion 6a helps to direct the air flow to the gap, allowing it to be reflected and directed to the engine part of the machine.

Figure 6:
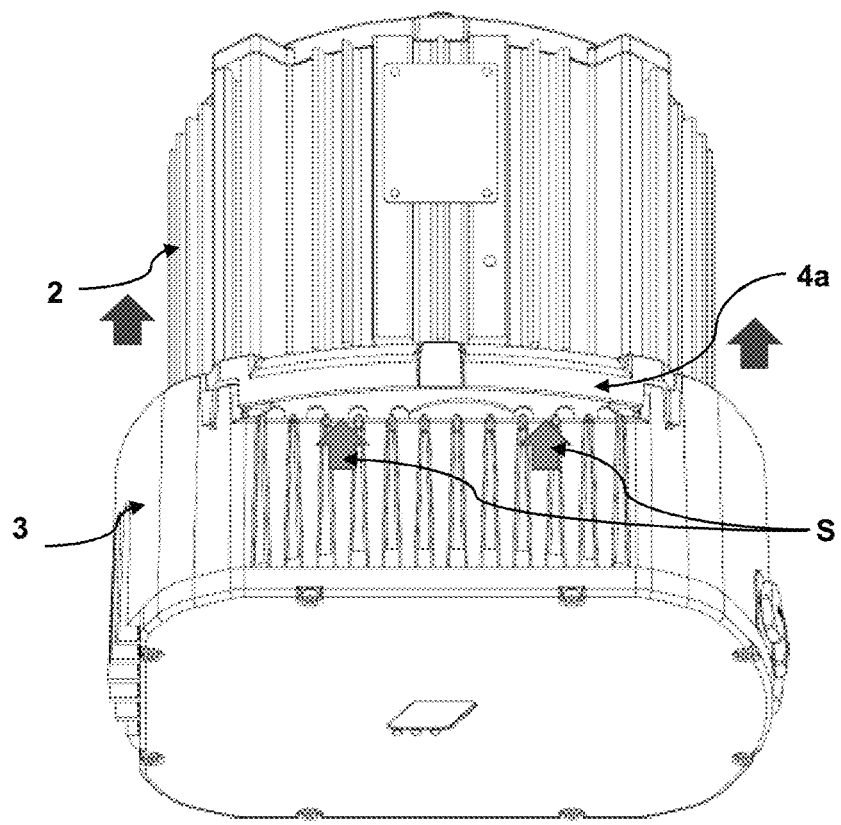
FIG. 6 is a perspective view of the electronically commuted rotating electric machine according to one embodiment of the present invention.
Figure 7:
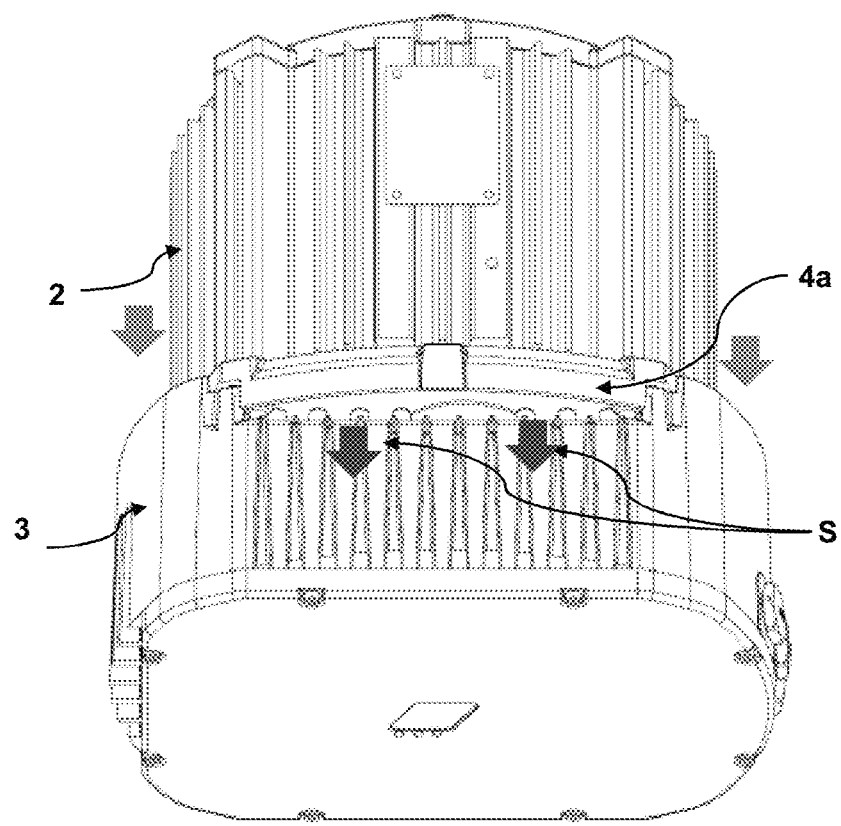
FIG. 7 is a perspective view of the electronically commuted rotating electric machine in accordance with one embodiment of the present invention.

Similarly, an air flow flowing from the rear of the machine hits the rear plate 4 and has a portion directed towards the gap (see arrow S in FIG. 6 for the flow flowing from the rear part).

In this sense, the deflecting portion 4a helps direct the air flow into the gap, allowing it to be reflected and directed to the control drive portion.

In one embodiment of the invention, the first and second housing parts are dimensioned so that when the air flow over the machine flows from the rear of the machine, a portion of the rear plate's 4 surface directly receives the air flow flowing from the rear of the machine, and when the air flow over the machine flows from the front of the machine, a portion of the front plate's 6 surface directly receives the air flow flowing from the front of the machine.

In this embodiment, the deflecting portion 4a is provided on the perimeter of the surface portion of the rear plate 4 receiving the flow. Similarly, the deflecting portion 6a is provided on the perimeter of the surface portion of the front plate 6 that receives the flow.

Figure 5:
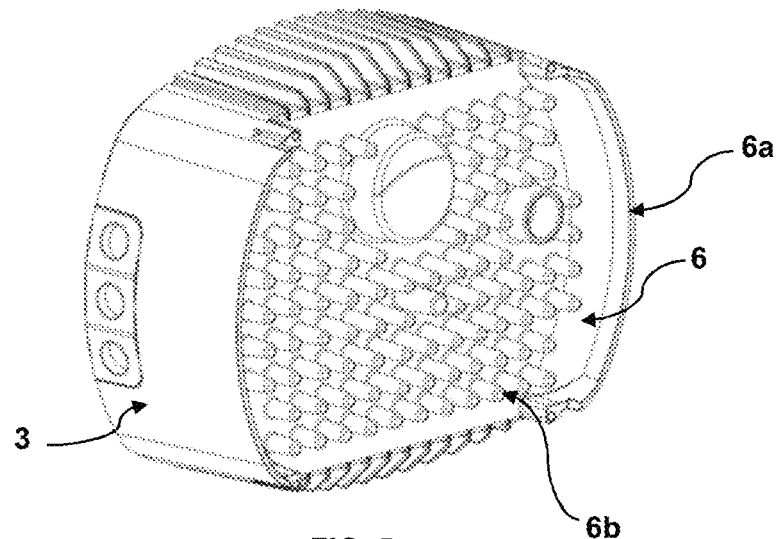
FIG. 5 is a perspective view of the drive portion of the electronically commuted rotating electric machine in accordance with one embodiment of the present invention.

As shown in FIG. 5, the front plate 6 may have a plurality of heat exchange projections 6b which assist in the thermal dissipation of the heat generated by the drive part.

In the embodiment shown in the drawings, the first and second housing parts are fixed by screws. However, alternative means of attachment could be used within the context of the present invention.

Having described an exemplary embodiment of the present invention, it should be understood that the scope of the present invention encompasses other possible variations of the inventive concept described, being limited only by the scope of the appended claims, including the possible equivalents thereof.

The invention claimed is:

1. An electronically commutated electric rotating machine comprising a first housing part which houses an active core of the machine and a second housing part which houses a drive control:
   the first and second housing parts are configured so that after being connected to one another, a gap is formed between said first and second housing parts;
   wherein the first housing part comprises a rear plate with at least one deflecting portion formed at an outer perimeter of a surface portion of the rear plate so that the at least one deflecting portion of the first housing part projects outwardly from the first housing part;
   the second housing part comprises a front plate comprising at least one deflecting portion formed at an outer perimeter of a surface portion of the front plate so that the at least one deflecting portion of the second housing part projects outwardly from the second housing part;
   the at least one deflecting portion of the rear plate and the at least one deflecting portion of the front plate do not overlap on a circumferential direction;
   the first and second housing parts are dimensioned so that:
   a portion of the at least one deflecting portion formed at the outer perimeter of a surface portion of the rear plate directly receives an air flow flowing over the machine, externally to the first housing part, from a rear part of the machine; and a portion of the at least one deflecting portion formed at the outer perimeter of a surface portion of the front plate directly receives an air flow flowing over the machine, externally to the second housing part from a front part of the machine; and wherein the gap is formed between the rear plate and the front plate, so that the deflecting portions are configured to divert a portion of said air flow flowing externally to the first and second housing parts into the gap.

2. The machine according to claim 1, wherein the deflecting portions are shaped with a concave shape.

3. The machine according to claim 1, wherein the front plate has a plurality of heat exchange projections.

\* \* \* \* \*